(12) United States Patent
Nagasawa

(10) Patent No.: US 11,242,025 B2
(45) Date of Patent: Feb. 8, 2022

(54) OCCUPANT PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 16/774,112

(22) Filed: Jan. 28, 2020

(65) Prior Publication Data
US 2020/0307491 A1  Oct. 1, 2020

(30) Foreign Application Priority Data

Mar. 29, 2019 (JP) .............................. JP2019-069388

(51) Int. Cl.
| | |
|---|---|
| *B60R 21/207* | (2006.01) |
| *B60R 21/231* | (2011.01) |
| *B60R 21/2334* | (2011.01) |
| *B60R 21/00* | (2006.01) |
| *B60R 21/013* | (2006.01) |

(52) U.S. Cl.
CPC ............ *B60R 21/207* (2013.01); *B60R 21/00* (2013.01); *B60R 21/013* (2013.01); *B60R 21/2334* (2013.01); *B60R 21/23138* (2013.01); *B60R 2021/0006* (2013.01); *B60R 2021/23146* (2013.01)

(58) Field of Classification Search
CPC ........................ B60R 21/23138; B60R 21/231
See application file for complete search history.

(56) References Cited

U.S. PATENT DOCUMENTS

| | | | | |
|---|---|---|---|---|
| 4,592,523 | A * | 6/1986 | Herndon | ................ B64D 25/02 244/122 AG |
| 7,048,300 | B2 | 5/2006 | Honda et al. | |
| 7,665,761 | B1 * | 2/2010 | Green | ................... B60R 21/233 280/733 |
| 9,238,425 | B2 | 1/2016 | Fukawatase | |
| 9,758,127 | B1 * | 9/2017 | Farooq | .................... B60R 22/14 |
| 10,189,432 | B2 | 1/2019 | Matsushita et al. | |
| 10,632,958 | B2 * | 4/2020 | Dry | .......................... B60N 2/14 |
| 10,710,539 | B2 * | 7/2020 | Cho | ....................... B60R 21/207 |
| 10,926,733 | B2 * | 2/2021 | Dry | ....................... B60R 21/207 |

(Continued)

FOREIGN PATENT DOCUMENTS

| | | |
|---|---|---|
| DE | 102017218338 A1 | 4/2019 |
| DE | 102019106035 A1 | 9/2019 |

(Continued)

OTHER PUBLICATIONS

Office Action dated Jun. 22, 2021 in U.S. Appl. No. 16/774,094 (9 pages).

*Primary Examiner* — Nicole T Verley
(74) *Attorney, Agent, or Firm* — Smith, Gambrell & Russell, LLP

(57) ABSTRACT

An occupant protection apparatus is configured to protect an occupant to sit on a seat of a vehicle. The apparatus includes an airbag in a shape of a rod at least in part. The airbag extends downward from above shoulders of the occupant to deploy on sides of the shoulders. At a completion of deployment, part of the airbag becomes approximately straight, and an upper part of the airbag tilts toward a center of the seat in a right-to-left direction.

17 Claims, 4 Drawing Sheets

(56) References Cited

U.S. PATENT DOCUMENTS

| | | | |
|---|---|---|---|
| 10,967,826 B2* | 4/2021 | Henriksson | B60R 21/26 |
| 2013/0093224 A1* | 4/2013 | Dainese | B60R 21/207 |
| | | | 297/216.12 |
| 2014/0042733 A1 | 2/2014 | Fukawatase | |
| 2016/0082915 A1* | 3/2016 | Madaras | B60R 21/231 |
| | | | 297/216.2 |
| 2016/0347272 A1* | 12/2016 | Kato | B60R 21/207 |
| 2017/0144622 A1* | 5/2017 | Perlo | B60R 21/233 |
| 2017/0259704 A1* | 9/2017 | Madaras | B60R 21/04 |
| 2017/0259774 A1* | 9/2017 | Matsushita | B60R 21/23138 |
| 2018/0222432 A1* | 8/2018 | Schneider | B60R 21/261 |
| 2019/0016293 A1* | 1/2019 | Saso | B60R 21/207 |
| 2019/0023214 A1* | 1/2019 | Kitagawa | B60R 21/2338 |
| 2019/0054890 A1* | 2/2019 | Kwon | B60R 21/23138 |
| 2019/0248323 A1 | 8/2019 | Saito et al. | |
| 2019/0291678 A1* | 9/2019 | Cho | B60R 21/231 |
| 2020/0238944 A1 | 7/2020 | Huf et al. | |
| 2020/0307490 A1 | 10/2020 | Nagasawa | |
| 2020/0331421 A1 | 10/2020 | Saito et al. | |
| 2020/0406855 A1 | 12/2020 | Saito et al. | |
| 2021/0170983 A1 | 6/2021 | Shin et al. | |

FOREIGN PATENT DOCUMENTS

| | | | | |
|---|---|---|---|---|
| JP | 3950356 B2 | | 8/2007 | |
| JP | 2009-029182 | | 2/2009 | |
| JP | 2013124063 A | * | 6/2013 | |
| JP | 2013220714 A | * | 10/2013 | |
| JP | 2014-012495 | | 1/2014 | |
| JP | 5952680 B2 | | 7/2016 | |
| JP | 2019147426 A | * | 9/2019 | |
| KR | 102167448 B1 | | 10/2020 | |
| KR | 102209220 B1 | | 1/2021 | |
| KR | 102225420 B1 | | 3/2021 | |
| WO | 2013/099888 A1 | | 7/2013 | |
| WO | 2016/039160 A1 | | 3/2016 | |
| WO | WO-2017179839 A1 | * | 10/2017 | ....... B60R 21/23138 |
| WO | 2019/107053 A1 | | 6/2019 | |
| WO | 2019/107398 A1 | | 6/2019 | |
| WO | WO-2020080747 A1 | * | 4/2020 | ........... B60R 21/233 |
| WO | 2019/107398 | | 10/2020 | |
| WO | 2021/033433 A1 | | 2/2021 | |
| WO | 2021/059766 A1 | | 4/2021 | |
| WO | 2021/065304 A1 | | 4/2021 | |

* cited by examiner

OCCUPANT PROTECTION APPARATUS

CROSS-REFERENCE TO RELATED APPLICATIONS

The present application claims priority from Japanese Patent Application No. 2019-069388 filed on Mar. 29, 2019, and the entire contents of which are hereby incorporated by reference.

BACKGROUND

The disclosure relates to an occupant protection apparatus.

Conventionally, a seat belt apparatus and an airbag apparatus have been used as an occupant protection apparatus to protect an occupant of a vehicle such as an automobile from a collision and so forth. This sort of airbag apparatus includes a front airbag configured to deploy backward from in front of the occupant. This front airbag is configured to protect the occupant in, for example, a front collision of the vehicle by deploying to receive and support the occupant moving forward due to the impact of the front collision.

The airbag apparatus also includes a curtain airbag for a lateral collision of the vehicle. This curtain airbag is configured to deploy along the side surfaces of the vehicle interior in the front-to-back direction of the vehicle. The curtain airbag is configured to protect the occupant in, for example, a lateral collision of the vehicle by deploying to receive and support the occupant moving outward in the vehicle width direction due to the impact of the lateral collision. Meanwhile, in case of the lateral collision, the occupant sitting on the side (referred to as "far side") far from the side (referred to as "near side") hit by an object is forcibly moved to the near side, and therefore a far side airbag configured to deploy between the driver's seat and the seat next to the driver has been proposed.

However, differently from an airbag configured to deploy in the near side, a common far side airbag is not adjacent to a supportive object such as a side door. Therefore, the far side airbag expanding and deploying may fall down due to the impact to receive the occupant, and consequently may not reliably hold the occupant. To address this, there has been provided a side airbag apparatus including a small airbag configured to deploy on the far side and a belt set outside the airbag to support the airbag, which is disclosed, for example, in Japanese Unexamined Patent Application Publication No. 2014-012495.

SUMMARY

An aspect of the disclosure provides an occupant protection apparatus configured to protect an occupant to sit on a seat of a vehicle. The occupant protection apparatus includes an airbag in a shape of a rod at least in part. The airbag is configured to extend downward from above shoulders of the occupant to deploy on sides of the shoulders. At a completion of deployment, part of the airbag becomes approximately straight, and an upper part of the airbag tilts toward a center of the seat in a right-to-left direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Various types of vehicle collisions in all directions are possible, and some types of collisions exhibit complex movements, such as rolling and yawing, and therefore, to address the various types of collisions, the costs become much expensive. In addition, as a conventional airbag apparatus, a plurality of airbags are used to hold body parts of an occupant, a large force may be focused on a specific part of the occupant.

Figure 1:
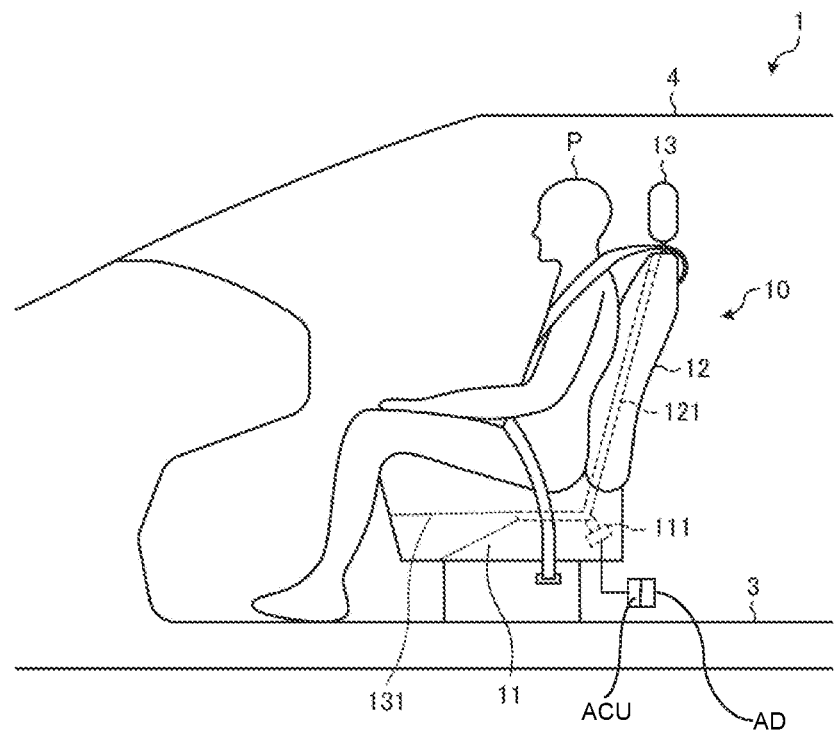
FIG. 1 is a cross-sectional view illustrating an exemplary vehicle equipped with an occupant protection apparatus according to an embodiment of the disclosure.
Figure 2:
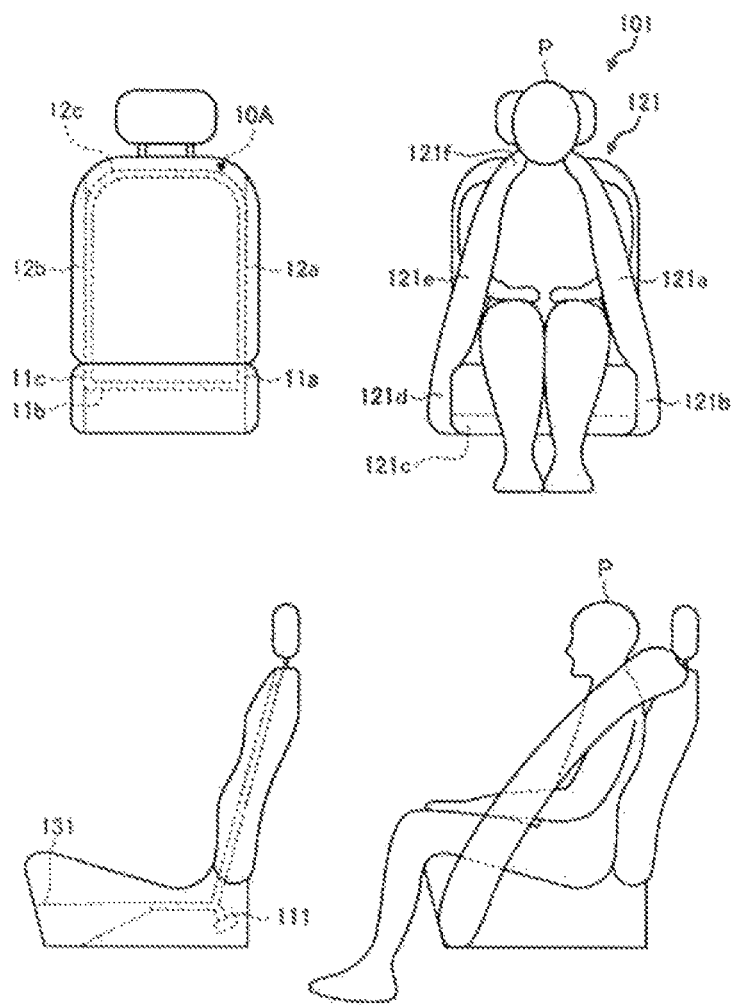
FIG. 2 illustrates a state when an airbag is stored and a state when the airbag is deployed according to the embodiment of the disclosure.

It is desirable to provide an occupant protection apparatus capable of addressing various types of collisions and reducing the impact on the occupant to improve a function to protect the occupant. First, the configuration of a vehicle equipped with an occupant protection apparatus according to an embodiment of the disclosure will be described. FIG. 1 is a cross-sectional view illustrating the vehicle equipped with the occupant protection apparatus according to the embodiment of the disclosure. FIG. 2 illustrates a state when an airbag is stored and a state when the airbag is deployed according to the embodiment of the disclosure. FIGS. 3A-3D illustrate a process of deployment of the airbag according to the embodiment of the disclosure.

<Configuration of Vehicle 1>

As illustrated in FIG. 1, an occupant compartment of a vehicle 1 includes an under floor 3 provided in its lower part and a roof 4 provided in its upper part. A seat 10 is provided on the under floor 3.

An occupant P of the vehicle 1 sits on the seat 10. The seat 10 includes a seat cushion (seat bottom) 11 on which the hip and thighs of an occupant P rest, a seat back (backrest) 12 configured to recline, and a head rest (head portion) 13 configured to support the head of the occupant P.

The seat 10 includes a storage member 10A configured to store an airbag 121 described later. The storage member 10A includes storage portions 12a, 12b and 12c of the seat back 12, and storage portions 11a, 11b and 11c of the seat cushion 11. The storage portion 12a of the seat back 12 is provided along the left side of the seat back 12 from the upper end to the lower end of the seat back 12. In addition, the storage portion 12b of the seat back 12 is provided along the right side of the seat back 12 from the upper end to the lower end of the seat back 12. Moreover, the storage portion 12c of the seat back 12 is provided along the upper part of the seat back 12. The storage portion 12b and the storage portion 12c connect with one another, and the storage portion 12c and the storage portion 12a connect with one another.

Meanwhile, the storage portions 11a, 11b and 11c are provided under the seat surface of the seat cushion 11. The storage portion 11a of the seat cushion 11 is provided along the left side of the seat cushion 11 from the back to the front of the seat cushion 11. The back part of the storage portion 11a extends to the upper end of the seat cushion 11. In addition, the storage portion 11b of the seat cushion 11 is provided to extend from side to side in the seat cushion 11.

Moreover, the storage portion 11c of the seat cushion 11 is provided along the right side of the seat cushion 11 from the back to the front of the seat cushion 11. The back part of the storage portion 11c extends to the upper end of the seat cushion 11. The storage portion 11a and the storage portion 11b connect with one another, and the storage portion 11b and the storage portion 11c connect with one another.

Moreover, the storage portion 12a of the seat back 12 and the storage portion 11a of the seat cushion 11 connect with one another, and the storage portion 11c of the seat cushion 11 and the storage portion 12b of the seat back 12 connect with one another. Therefore, the storage portions of the storage member 10A of the seat 10 connect in the order of the storage portion 12a of the seat back 12, the storage portions 11a, 11b, and 11c of the seat cushion 11, the storage portions 12b, 12c and 12a of the seat back 12.

The seat cushion 11 of the seat 10 includes a guide path 131 configured to guide the airbag 121 stored in the storage portion 11b of the seat cushion 11 to deploy in the deployment direction. The guide path 131 is configured to extend forward and obliquely downward from the storage portion 11b of the seat cushion 11. The width of the guide path 131 increases toward the front end of the guide path 131. The front end of the guide path 131 is located near the bottom of the seat cushion 11. The lower part of the seat cushion 11 near the front end of the guide path 131 can be torn, so that the deploying airbag 121 can protrude from the seat cushion 11.

<Configuration of Occupant Protection Apparatus 101>

Next, the configuration of the occupant protection apparatus according to the embodiment of the disclosure will be described. The occupant protection apparatus according to the embodiment is controlled by an airbag deployment control unit (ACU) and an electronic control unit (ECU). The occupant protection apparatus 101 includes an inflator 111 and the airbag 121.

<Inflator>

Upon receiving a signal from an abnormality detector AD or the ECU having detected a collision of the vehicle 1 or collision prediction, the inflator 111 ignites explosives to generate gas by the chemical reaction due to combustion, and injects the gas into the airbag 121. That is, the inflator 111 is configured to supply gas to the airbag 121. Here, the inflator 111 is provided in the back part of the seat cushion 11 of the seat 10. That is, the inflator 111 is provided below the seat back 12.

The inflator 111 injects the gas into the airbag 121 at a position in the storage portion 11a of the seat cushion 11 near the storage portion 12a of the seat back 12, and at a position in the storage portion 11c of the seat cushion 11 near the storage portion 12b of the seat back 12. However, the gas may be injected into the airbag 121 at a position higher than the seat cushion 11, that is, at a given position of each of the storage portions 12a and 12b of the seat back 12 depending on the flow condition of the gas.

<Airbag 121>

The airbag 121 has a pouch shape into which the gas is injected by the inflator 111. When the airbag 121 is not actuated, it is compactly folded. The airbag 121 is stored in the seat 10. To be more specific, the airbag 121 is stored in the storage member 10A of the seat 10. That is, the airbag 121 is stored in the storage portions 12a, 12b and 12c of the seat back 12 and the storage portions 11a, 11b and 11c of the seat cushion 11. Therefore, the airbag 121 is provided in the right and left parts and the upper and lower parts of the seat 10 as follows.

Starting from the upper part of the seat back 12, the airbag 121 extends to the lower part of the seat back 12 along one side wall of the seat back 12, gets into the back part of the seat cushion 11 from the lower part of the seat back 12, and goes forward along one side of the seat cushion 11. Then, the airbag 121 crosses to the other side in the seat cushion 11 to extend in the back part of the seat cushion 11, and goes into the lower part of the seat back 12 on the other side. Then, the airbag 121 extends upward along the other side of the seat back 12, extends along the upper part of the seat back 12, and returns to the stating position, so that the airbag 121 is provided in a circular ring shape.

Therefore, the airbag 121 is provided to extend along the sides of the seat back 12 from the upper part of the seat back 12 into the seat cushion 11 under the seat surface. In addition, the part of the airbag 121 provided in the right side and the part of the airbag 121 provided in the left side connect with one another in the upper part and the lower part of the airbag 121. In this example, the airbag 121 is provided from the upper part of the seat back 12, but the disclosure is not limited to this. The airbag 121 may be provided from the head rest.

Hereinafter, for the purpose of illustration, parts of the airbag 121 stored in the storage portion 12a of the seat back 12, the storage portions 11a, 11b, 11c of the seat cushion 11, and the storage portions 12b and 12c of the seat back 12 are referred to as airbags 121a, 121b, 121c, 121d, 121e, and 121f, respectively. Here, note that the airbag 121 is shaped into a seamless circular ring and actually is not separated into the above-described portions, and the positions of the portions are not exact but indicate an approximate range of each of the portions of the airbag 121 stored in the storage portion.

As described above, when the gas is injected into the airbag 121 to expand the airbag 121, mainly the airbag 121c stored in the storage portion 11b of the seat cushion 11 is guided downward and forward along the guide path 131. That is, the guide path 131 functions as an airbag guide. However, this is by no means limiting, and the airbag 121c may be guided downward and forward by using an inflator for guiding, guided by pulling the airbag 121c by using a winder mechanism, or guided by using a hydraulic mechanism.

When the airbag 121 is expanded and deployed, the airbags 121a and 121e protrude outward from the sides of the seat back 12, and the airbag 121f protrudes upward from the upper part of the seat back 12. Here, each of the airbags 121*a* and 121*e* is deployed in approximately the shape of a rod. Meanwhile, the airbags 121*b* and 121*d* protrude outward from the sides of the seat cushion 11.

By this means, the airbags 121*a* and 121*e* extend downward from above the shoulders of the occupant P to deploy on the sides of the shoulders. In addition, the airbags 121*b* and 121*a*, and the airbags 121*d* and 121*e* are deployed to extend from the sides of the legs or the lower bag toward the fronts of the shoulders of the occupant P. Moreover, at the completion of the deployment of the airbag 121, the airbags 121*b* and 121*a* becomes approximately straight, and the upper part of the airbag 121*a* tilts toward the center of the seat 10 in the right-to-left direction. The same applies to the airbags 121*d* and 121*e*. The details will be described later. Therefore, the expanded and deployed airbag 121 is formed in an inverted V shape to hold the occupant P. In this embodiment, the airbag 121 protrudes outward, but the disclosure is not limited to this. For example, the airbags 121*a*, 121*e*, and 121*f* may protrude forward from the seat back 12, or the airbags 121*b* and 121*d* may protrude upward from the seat cushion 11.

<Operation of Occupant Protection Apparatus 101>

Next, the operation of the occupant protection apparatus 101 when the vehicle 1 collides with an object will be described.

When the occupant protection apparatus 101 detects a collision of the vehicle 1 or collision prediction, the inflator 111 is actuated to inject gas into the airbag 121. The gas is injected from the inflator 111 into the airbag 121 such that, first the gas is injected into the airbags 121*b* and 121*d* stored in the storage portions 11*a* and 11*c* of the seat cushion 11, and then, from there, is injected into the airbags 121*a* and 121*e* stored in the storage portions 12*a* and 12*b* of the seat back 12. By this means, the airbags 121*b* and 121*d* are expanded and protrude outward to deploy on the sides of the seat cushion 11, and also the airbags 121*a* and 121*e* are expanded and protrude outward to deploy on the sides of the seat back 12, respectively.

Moreover, the gas is injected from the airbags 121*a* and 121*e* into the airbag 121*f* stored in the storage portion 12*c* provided in the upper part of the seat back 12. By this means, the airbag 121*f* is also expanded and protrudes upward from the seat back 12, and connects between the airbags 121*a* and 121*e* behind the occupant P. Alternatively, an upper holder configured to hold the airbag 121*f* may be provided behind or above the head of the occupant P and between and above the shoulders of the occupant P in the right-to-left direction, that is, above near the center of the seat back 12. By this means, it is possible to fix the airbag 121 to the upper part of the seat back 12.

Meanwhile, the gas is injected from the airbags 121*b* and 121*d* into the airbag 121*c* stored in the storage portion 11*b* extending from side to side in the seat cushion 11. Then, the expanded airbag 121*c* can no longer be stored in the storage portion 11*b* of the seat cushion 11 and is guided downward and forward along the guide path 131. By this means, the distance from the airbag 121*f* to the airbag 121*c* is increased, and therefore the airbags 121*a* and 121*b* and the airbags 121*e* and 121*d* are pulled downward and forward. Therefore, the airbags 121*a* and 121*b* become straight, and also the airbags 121*e* and 121*d* become straight, and consequently the airbag 121 is formed in an inversed V shape whose apex is located behind the head of the occupant P.

Figure 3A:
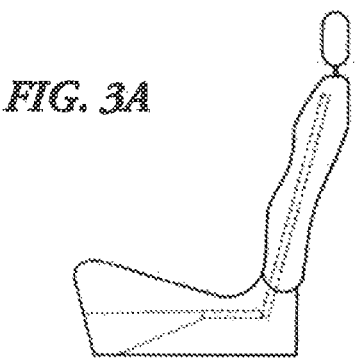
FIGS. 3A-3D illustrate a process of deployment of the airbag according to the embodiment of the disclosure.
Figure 3C:
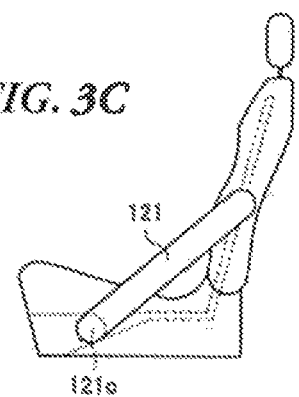
Figure 3B:
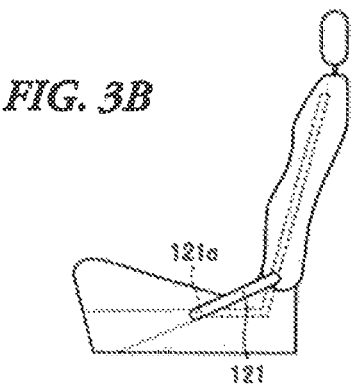

Here, a process of deployment of the airbag 121 guided by the guide path 131 will be described in detail. As illustrated in FIGS. 3A to 3D, the gas is injected from the inflator 111 into the airbag 121 such that, first the gas is injected into the airbags 121*b* and 121*d*, and then into the airbag 121*c*. Then, the expanded airbag 121*c* can no longer be stored in the storage portion 11*b* of the seat cushion 11 and is guided slightly downward and forward along the guide path 131 as illustrated in FIG. 3B. When the gas is further injected into the airbag 121*c*, the expanded airbag 121*c* is guided further downward and forward along the guide path 131 as illustrated in FIG. 3C. Meanwhile, the gas is also injected into the airbags 121*a* and 121*e*, and then the airbags 121*b* and 121*d* are protruded from the seat cushion 11 and deployed on the right and left sides of the seat cushion 11.

Figure 3D:
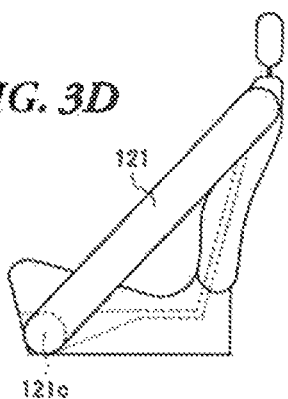

Then, when the gas is further injected into the airbag 121*c*, the airbag 121*c* is maximally expanded and guided to the front and bottom of the guide path 131 as illustrated in FIG. 3D. In this way, the airbag 121*c* which is the lower part of the airbag 121 is guided by the guide path 131, and deployed in the front and lower part of the seat 10.

By this means, starting from the position behind the head of the occupant P, the airbag 121 extends along the fronts of the shoulders and the sides of the thighs, and then extends under the lower body to surround the occupant P in an inverted V shape. Therefore, it is possible to address various types of collisions, such as a front collision and a lateral collision, and consequently to improve the function to protect the occupant.

In addition, even though the occupant P is almost moved outward, one side of the airbag 121 (for example, the airbags 121*a* and 121*b* or the airbags 121*e* and 121*d*) is pulled in the direction opposite to the direction in which the occupant P slumps against the airbag 121 by the other side of the airbag 121 in the right-to-left direction, and therefore it is possible to sufficiently apply a reaction force.

Another Embodiment

Figure 4:
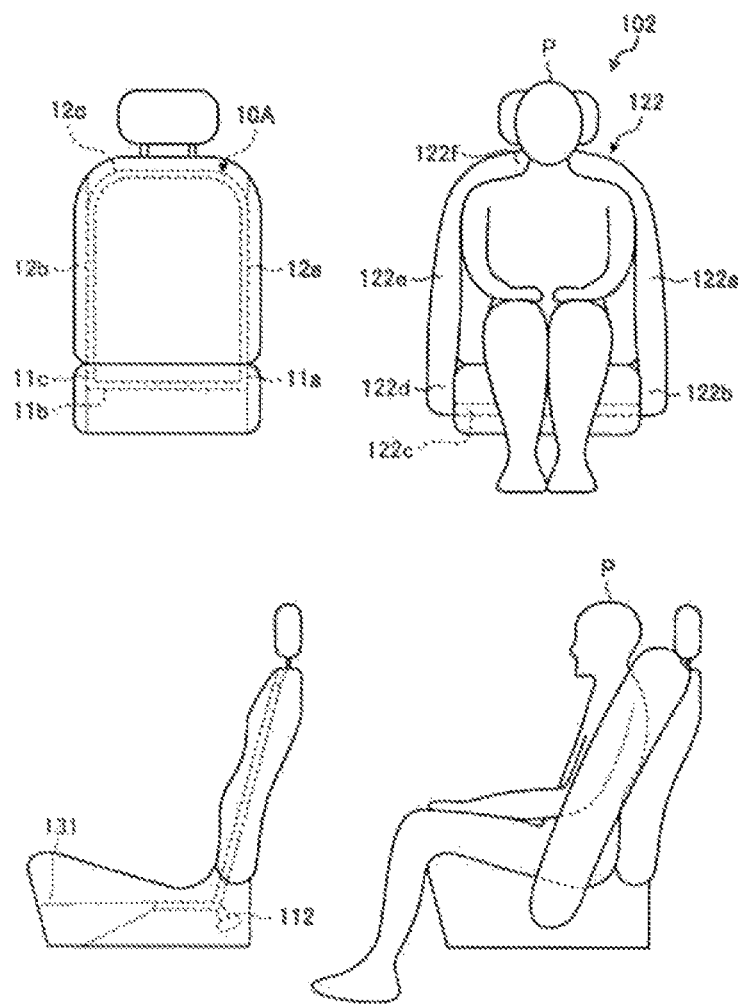
FIG. 4 illustrates a state when an airbag is stored and a state when the airbag is deployed according to another embodiment of the disclosure.

Next, an occupant protection apparatus configured to deploy an airbag in a different shape when a lateral collision occurs will be described. FIG. 4 illustrates a state when an airbag is stored and a state when the airbag is deployed according to another embodiment of the disclosure.

The seat 10 according to this embodiment is the same as that of the above-described embodiment. That is, the seat 10 includes the storage member 10A configured to store an airbag 122, and the storage member 10A includes storage portions 12*a*, 12*b* and 12*c* of the seat back 12, and storage portions 11*a*, 11*b* and 11*c* of the seat cushion 11. Also the seat cushion 11 includes the guide path 131 configured to guide the deploying airbag 122.

<Configuration of Occupant Protection Apparatus 102>

With the embodiment, an occupant protection apparatus 102 includes an inflator 112, the airbag 122, and an ECU. The ECU of the occupant protection apparatus 102 has a function as a collision type detector configured to detect or predict the collision type of the vehicle 1, and a function as a deployment controller configured to control the deployment of the airbag 122 when the collision type detector predicts or detects a lateral collision. Therefore, the ECU may be provided separately from the occupant protection apparatus 102 as long as the occupant protection apparatus 102 includes the function as a collision type detector and the function as a deployment controller.

<Inflator 112>

The inflator 112 which is the same as the above-described inflator 112 generates gas based on the detection of a collision of the vehicle 1 or collision prediction, and injects the gas into the airbag 122.

<Airbag 122>

Like the above-described airbag 121, the airbag 122 has a circular ring shape and is stored in the seat 10. That is, the airbag 122 is stored in the storage portion 12a of the seat back 12, the storage portions 11a, 11b, and 11c of the seat cushion 11, and the storage portions 12b and 12c of the seat back 12. Here, also with this embodiment, for the purpose of illustration, parts of the airbag 122 stored in the storage portion 12a of the seat back 12, the storage portions 11a, 11b, 11c of the seat cushion 11, and the storage portions 12b and 12c of the seat back 12 are referred to as airbags 122a, 122b, 122c, 122d, 122e, and 122f, respectively.

When detecting a collision of the vehicle 1 or collision prediction, the occupant protection apparatus 102 determines whether the collision is a lateral collision. When determining that the collision is not a lateral collision, that is, the collision is a front collision or a rear collision, the occupant protection apparatus 102 deploys the airbag 122 to surround the seat 10 in the same way as the airbag 121. On the other hand, when determining that the collision is a lateral collision, the occupant protection apparatus 102 deploys the airbag 122 partway in the same way as the airbag 121.

That is, the occupant protection apparatus 102 actuates the inflator 112 to inject the gas into the airbag 122. To be more specific, when the inflator 112 is actuated, the gas is injected from the inflator 112 into the airbags 122b and 122d, and then, from there, injected into the airbags 122a and 122e. By this means, the airbags 122b and 122d are expanded and protrude outward to deploy on the sides of the seat cushion 11, and also the airbags 122a and 122e are expanded and protrude outward to deploy on the sides of the seat back 12, respectively.

Moreover, the gas is injected from the airbags 122a and 122e into the airbag 122f. By this means, the airbag 122f is also expanded and protrudes upward from the seat back 12, and connects between the airbags 122a and 122e behind the occupant P.

Meanwhile, the gas is injected from the airbags 122b and 122d into the airbag 122c. Then, the expanded airbag 122c can no longer be stored in the storage portion 11b of the seat cushion 11 and is guided downward and forward along the guide path 131. The operations are the same as those in the above-described embodiment so far.

When a lateral collision is detected, the occupant protection apparatus 102 restricts the airbag 122c from moving more forward than in a front collision and a rear collision. For example, a tether may be provided in the airbag 122c to restrict the airbag 122c from moving forward. Then, in case of a front collision or a rear collision of the vehicle 1, the tether may be cut. Alternatively, an elastic member made of such as rubber may be applicable. Otherwise, a stopper may be provided in the guide path 131, and released in case of a front collision or a rear collision.

In addition, the guide path 131 may be modified. In this case, in addition to the guide path 131, a second guide path extending forward by a distance shorter than the guide path 131 may be provided, and the airbag 122c may be guided to this second guide path in case of a lateral collision.

By this means, the airbag 122 moves forward by a distance shorter than in a front collision and a rear collision, and therefore it is possible to prevent the airbags 122a and 122b and the airbags 122e and 122d from moving to the front of the occupant P, and to deploy the airbags 122a and 122b and the airbags 122e and 122d on the sides of the occupant P. Therefore, it is possible to optimize the protection of the occupant P against a lateral collision.

Meanwhile, for example, a tether may be provided to restrict the airbags 121a and 121e from moving forward. By this means, in case of a lateral collision, it is possible to maintain the deployment positions of the airbags 121a and 121b and the airbags 121e and 121d on the sides of the occupant P, and in case of a front collision or a rear collision, it is possible to deploy the airbags 121a and 121b and the airbags 121e and 121d in front of the shoulders of the occupant P to prevent the occupant P from moving forward.

In addition, in case of a lateral collision, the length of the airbag 121c in the right-to-left direction may be shortened. For example, approximately the center part of the airbag 121c may be pulled. By this means, in case of a lateral collision, it is possible to increase a tensional force to pull the airbags 121a and 121b, and the airbags 121e and 121d.

Moreover, in the case where the second guide path is provided, the second guide path may be extended downward to increase the length of the second guide path, so that it is possible to improve the tensional force.

As described above, the airbag (121, 122) is deployed such that, starting from the position behind the head of the occupant P, the airbag (121, 122) extends along the fronts of the shoulders and the sides of the thighs, and then extends under the lower body to surround the occupant P in an inverted V shape. Therefore, the occupant protection apparatus (101, 102) can address various types of collisions such as a front collision and a lateral collision, and consequently improve the function to protect the occupant P. Moreover, a tensional force is applied in the upper and lower parts of the airbag (121, 122) in the direction opposite to the direction in which the occupant P slumps against the airbag (121, 122). Therefore, it is possible to reduce the impact on the occupant P, and consequently to improve the function to protect the occupant P.

The invention claimed is:

1. An occupant protection apparatus configured to protect an occupant on a seat of a vehicle, the occupant protection apparatus comprising
   an airbag in a shape of a rod at least in part, the airbag being configured to extend downward from an above occupant shoulders location to deploy to locations on sides of shoulders of the occupant,
   wherein, at a completion of deployment, part of the airbag becomes approximately straight, and an upper part of the airbag tilts toward a center of the seat in a right-to-left direction, and
   wherein a lower part of the airbag extends laterally under an upper surface of a seat cushion of the seat from a first side region of the seat across to an opposite side region of the seat.

2. The occupant protection apparatus according to claim 1, wherein
   the lower part of the airbag is stored in a lower part of the seat cushion,
   the upper part of the airbag is stored in an upper part of a seat back, and
   the airbag is deployed from locations to the sides of legs or a lower back location of the occupant to locations at the fronts of the shoulders of the occupant.

3. The occupant protection apparatus according to claim 1, wherein:
   the airbag is disposed on right and left sides of the seat; and
   a right part and a left part of the airbag are coupled to one another at a location behind or above a head of the occupant.

4. The occupant protection apparatus according to claim 1, wherein the lower part of the airbag is deployed forward or downward in the seat.

5. The occupant protection apparatus according to claim 3, wherein the lower part of the airbag is deployed forward or downward in the seat.

6. The occupant protection apparatus according to claim 4, further comprising an airbag guide configured to guide the lower part of the airbag to deploy forward or downward in the seat.

7. The occupant protection apparatus according to claim 5, further comprising an airbag guide configured to guide the lower part of the airbag to deploy forward or downward in the seat.

8. The occupant protection apparatus according to claim 1, further comprising:
   a collision type detector configured to detect or predict a collision type of the vehicle; and
   a deployment controller configured to deploy the upper part of the airbag to locations outside of the shoulders of the occupant when the collision type detector detects that the collision type is a lateral collision.

9. The occupant protection apparatus according to claim 3, further comprising:
   a collision type detector configured to detect or predict a collision type of the vehicle; and
   a deployment controller configured to deploy the upper part of the airbag to locations outside of the shoulders of the occupant when the collision type detector detects that the collision type is a lateral collision.

10. The occupant protection apparatus according to claim 1, further comprising an airbag guide configured to guide the lower part of the airbag, following deployment from an airbag storage portion positioned under the upper surface of the seat cushion, as to deploy the lower part of the airbag both forward and downward within the seat.

11. An occupant protection apparatus configured to protect an occupant on a seat of a vehicle, the occupant protection apparatus comprising:
   an airbag in a shape of a rod at least in part, the airbag being configured to extend downward from an above occupant shoulders location to deploy to locations on sides of shoulders of the occupant, and wherein the airbag includes a lower part extending under an upper surface of a seat cushion of the seat as to form a complete, annular ring shape.

12. The occupant protection apparatus according to claim 1, further comprising an airbag guide configured to guide the lower part of the airbag, upon deployment, from a pre-deployment rear region of the seat cushion to a post-deployment front region of the seat cushion.

13. The occupant protection apparatus according to claim 1, wherein a degree of forward positioning extent of the lower part of the airbag under the upper surface of the seat cushion is adjustable in accordance with whether an anticipated collision is a frontal or side collision.

14. An occupant protection apparatus configured to protect an occupant while on a seat of a vehicle, the occupant protection apparatus comprising:
   an airbag configured to deploy to include a shape similar to a rod at least in part, wherein
   the airbag is configured to deploy to connect,
      a first position located at a top of a seatback of the seat or a headrest of the seat,
      a second position located at a side of a seat cushion of the seat in a width direction of the vehicle, and
      a third position located on an opposite side of the second position through the seat cushion.

15. The occupant protection apparatus according to claim 14, wherein the airbag is configured to be shaped into a seamless circular ring.

16. The occupant protection apparatus according to claim 15, wherein the airbag is configured to deploy, to hold an occupant located on the seat, in an inverted V-shape connecting the first, second and third positions.

17. The occupant protection apparatus according to claim 14, wherein the airbag is configured to deploy into an inverted V-shape connecting the first, second and third positions, to hold an occupant located on the seat.

* * * * *